United States Patent [19]

Kimura et al.

[11] Patent Number: 5,065,255
[45] Date of Patent: Nov. 12, 1991

[54] METHOD OF AND APPARATUS FOR SMOOTHING AN IMAGE HAVING A PERIODIC PATTERN

[75] Inventors: Hideaki Kimura, Kanagawa; Haruo Aoki; Hiromi Yazawa, both of Tokyo, all of Japan

[73] Assignee: Fuji Photo Film Co., Ltd., Kanagawa, Japan

[21] Appl. No.: 543,525

[22] Filed: Jun. 26, 1990

[30] Foreign Application Priority Data

Jun. 27, 1989 [JP] Japan .................................. 1-165607

[51] Int. Cl.$^5$ ............................................... H04N 1/40
[52] U.S. Cl. ....................................... 358/447; 382/55
[58] Field of Search .................... 382/54, 55; 358/169, 358/166, 162, 447, 456

[56] References Cited

U.S. PATENT DOCUMENTS

| | | | |
|---|---|---|---|
| 4,703,363 | 10/1987 | Kitamura | 382/55 |
| 4,855,933 | 8/1989 | Kondo | 382/55 |
| 4,873,577 | 10/1989 | Chamzas | 358/447 |
| 4,980,923 | 12/1990 | Kawamoto et al. | 382/55 |

Primary Examiner—Stephen Brinich
Attorney, Agent, or Firm—Sughrue, Mion, Zinn, Macpeak & Seas

[57] ABSTRACT

An image signal representing image information containing a periodic pattern is processed before it is broken up into halftone dots. First, the image information is averaged to generate an unsharpness signal, and then the unsharpness signal is processed for edge sharpness to generate a sharpness signal. Thereafter, a halftone-dot image is generated from the sharpness signal. More specifically, the sharpness signal $Sij^*$ is generated from a first unsharpness signal $Uij$ which is produced by averaging the image information and a second unsharpness signal $\bar{U}ij$ which is produced by averaging the first unsharpness signal $Uij$, according to the equation:

$$Sij^* = Uij + K \cdot (Uij - \bar{U}ij)$$

where
i = 1, 2, ... n,
j = 1, 2, ... n, and
K: sharpness parameter.

The halftone-dot image thus reproduced is sharp and free of a moiré pattern which would otherwise result from the periodic pattern.

4 Claims, 3 Drawing Sheets

METHOD OF AND APPARATUS FOR SMOOTHING AN IMAGE HAVING A PERIODIC PATTERN

BACKGROUND OF THE INVENTION

The present invention relates to a method of and an apparatus for processing an image signal, and more particularly to a method of and an apparatus for processing an image signal such that when image information containing a regular or periodic pattern is to be processed for halftone dot formation, the image information is first processed for unsharpness and then processed for sharpness, thereby reproducing a sharp image free from a moire pattern.

Image scanning reading and reproducing systems are widely used in the printing and platemaking industries for electrically processing image information of originals or subjects to produce original film plates with a view to simplifying the entire process and improving the quality of printed images.

The image scanning reading and reproducing systems are basically constructed of an image reading apparatus and an image recording apparatus. In the image reading apparatus, image information of an original or subject which is fed in an auxiliary scanning direction is scanned by a photosensor in a main scanning direction substantially normal to the auxiliary scanning direction, and the scanned image information is converted to an electric signal. Then, the photoelectrically converted image information is processed according to platemaking conditions. Thereafter, the processed image signal is converted into a light signal such as a laser beam signal which is applied to and recorded on an image recording medium of a photosensitive material such as a photographic film in the image recording apparatus. The image recording medium with the image recorded thereon is developed by an image developing device and will be used as a film plate for printing.

In the image scanning and reproducing systems, a continuous-tone image is converted into a halftone-dot image in order to reproduce the gradations of the continuous-tone image. If the image of an original has a regular or periodic pattern such as on a printed halftone-dot image, then the periodic pattern is stressed and the reproduced halftone-dot image tends to have a moire pattern.

One solution to the above problem is to adjust the angle of the halftone screen used to break up a continuous-tone image into halftone dots so that the generation of any moire pattern will be minimized. However, selecting an optimum halftone screen angle is a tedious and time-consuming task itself and also requires skill on the part of the operator. Another proposal involves alteration of the aperture size of the halftone screen for blurring the image, so that any periodic pattern contained in the image will be less recognizable. This process is however disadvantageous in that the processed image is relatively unclear and hence poor in quality. In addition, the process can be used in a limited range of applications since it is effective with only a system in which the aperture size is physically alterable.

SUMMARY OF THE INVENTION

It is a major object of the present invention to provide a method of and an apparatus for processing an image signal such that image information carried on an original and having a regular or periodic pattern is processed for unsharpness and thereafter processed for sharpness, thereby reproducing a sharp moire-free image from the image information with the periodic pattern.

Another object of the present invention is to provide a method of processing an image signal representing image information containing a periodic pattern, comprising the steps of averaging the image information to generate an unsharpness signal, processing the unsharpness signal for edge sharpness to generate a sharpness signal, and generating a halftone-dot image from the sharpness signal.

Still another object of the present invention is to provide the method further including the step of generating the sharpness signal Sij* from a first unsharpness signal Uij which is produced by averaging the image information and a second unsharpness signal $\overline{U}ij$ which is produced by averaging the first unsharpness signal Uij, according to the equation:

$$Sij^* = Uij + K \cdot (Uij - \overline{U}ij)$$

where
i = 1, 2, ... n,
j = 1, 2, ... n, and
K: sharpness parameter.

Yet another object of the present invention is to provide an apparatus for processing an image signal representing image information containing a periodic pattern, comprising an unsharpness processor for averaging the image information to generate an unsharpness signal, a sharpness processor for processing the unsharpness signal for edge sharpness to generate a sharpness signal, and a halftone-dot image generator for generating a halftone-dot image from the sharpness signal.

Yet still another object of the present invention is to provide an apparatus for processing an image signal representing image information containing a periodic pattern, comprising an unsharpness processor for averaging the image information to generate an unsharpness signal, a sharpness processor for processing the unsharpness signal for edge sharpness to generate a sharpness signal, memory means for storing the unsharpness signal, signal selector means for selectively transmitting the image signal representing the image information to the unsharpness processor and the unsharpness signal from the memory means to the sharpness processor, and a halftone-dot image generator for generating a halftone-dot image from the sharpness signal.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
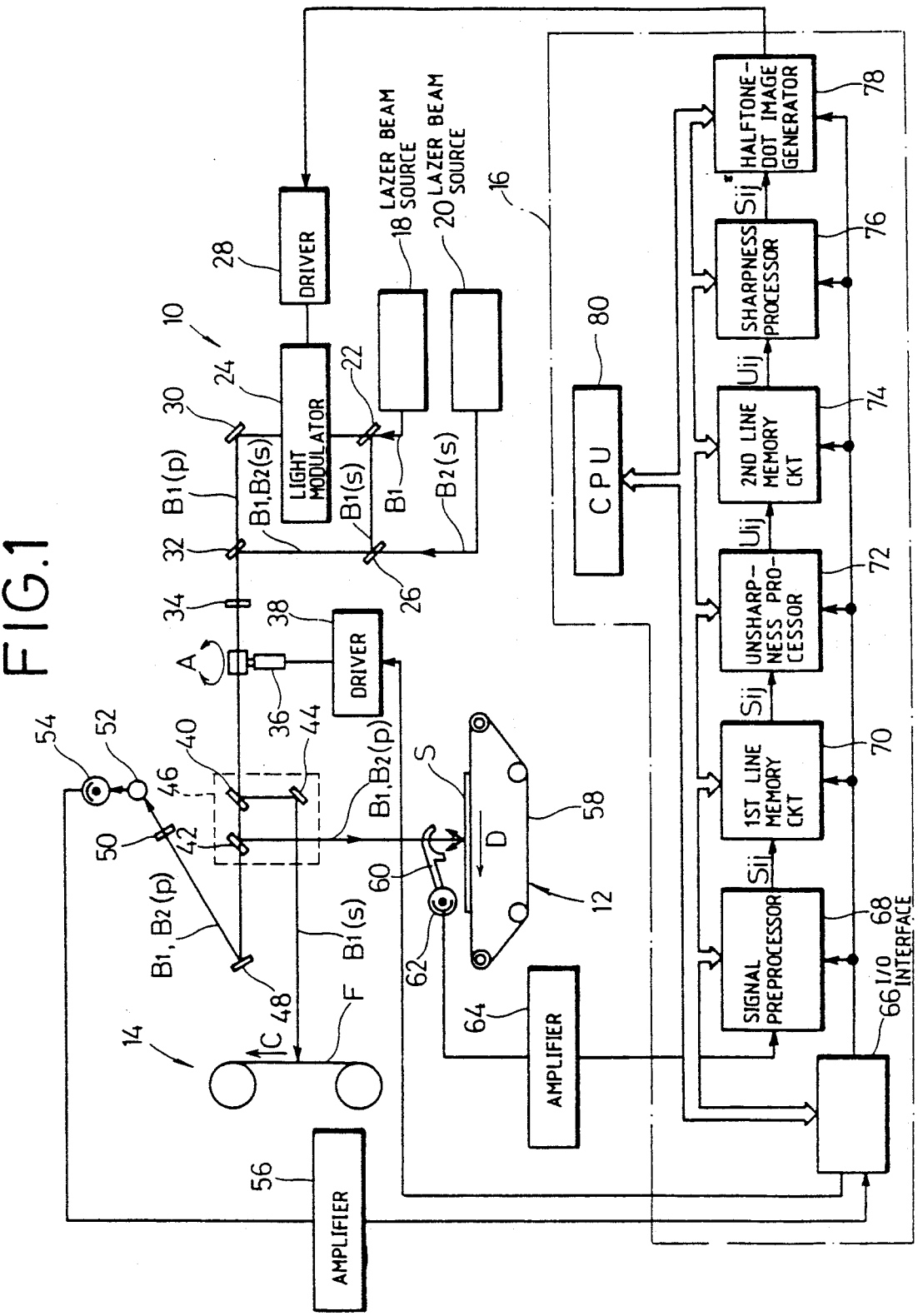
FIG. 1 is a schematic view, partly in block form, of an image scanning reading and reproducing system which incorporates an image signal processing apparatus according to the present invention.

As shown in FIG. 1, an image scanning reading and reproducing system 10 which incorporates an image signal processing apparatus according to the present invention is basically constructed of a laser beam optical system 10, an image reading apparatus 12, an image recording apparatus 14, and a controller 16.

The laser beam optical system 10 has a laser beam source 18 for emitting an $Ar^+$ laser beam $B_1$ to read and record an image and a laser beam source 20 for emitting an He-Ne laser beam $B_2$ which is S-polarized light. The laser beam $B_1$ which is emitted from the laser beam source 18 is divided into a P-polarized component and an S-polarized component by a polarizing beam splitter 22. The P-polarized component from the is applied to a light modulator 24 and the S-polarized beam component is applied to a semireflecting mirror 26. The light modulator 24 may comprise, for example, an acoustooptic modulator (AOM) which is driven by a driver 28 based on an image signal.

The laser beam $B_1$ that has been modulated by the light modulator 24 is reflected by a fully reflecting mirror 30 toward a semireflecting mirror 32. The laser beam $B_2$ which has been emitted from the laser beam source 20 passes through the semireflecting mirror 26 to the semireflecting mirror 32. The laser beam $B_1$, which has passed through the semireflecting mirror 32, and the laser beam $B_2$, which has been reflected by the semireflecting mirror 32, then travel through a halfwave plate 34 to a galvanometer mirror 36 which is being oscillated at high speed in the directions indicated by the arrows A by a driver 38. The laser beams $B_1$, $B_2$ are therefore deflected in directions normal to the sheet of FIG. 1 by the galvanometer mirror 36.

The deflected laser beams $B_1$, $B_2$ are applied to a beam splitter assembly 46 which comprises a polarizing beam splitter 40, a semireflecting mirror 42, and a fully reflecting mirror 44. The polarizing beam splitter 40 and the semireflecting mirror 42 direct only the P-polarized components of the laser beams $B_1$, $B_2$ toward a fully reflecting mirror 48 and the image reading apparatus 12. The polarizing beam spitter 40 and the fully reflecting mirror 44 direct only the S-polarized component of the laser beam $B_1$ toward the image recording apparatus 14. The image recording apparatus 14 is loaded with a photographic film F as a recording medium which is fed in an auxiliary scanning direction indicated by the arrow C.

The P-polarized components of the laser beams $B_1$, $B_2$ are applied to a reference grating 50 which has an array of equally spaced slits along the direction in which the laser beams $B_1$, $B_2$ are scanned. A cylindrical light guide bar 52 is disposed behind and extends longitudinally along the reference grating 50. One end of the light guide bar 52 is coupled to a photomultiplier 54 which serves as a photoelectric transducer means. The photomultiplier 54 converts the laser beams $B_1$, $B_2$, which have been applied through the reference grating 50 and the light guide bar 52, into an electric signal which is then applied through an amplifier 56 to the controller 16.

The image reading apparatus 12 has a feed means 58 for feeding an original or subject S that carries image information in an auxiliary scanning direction indicated by the arrow D. The laser beams $B_1$, $B_2$ from the beam splitter assembly 46 are applied to the original S, and reflected light from the original S, which carries image information of the original S, is guided through a light guide 60 comprising optical fibers to a photomultiplier 62 as a photoelectric transducer means, which converts the light into an electric signal. The electric signal, which represents the image information of the original S, is supplied through an amplifier 64 to the controller 16.

The controller 16 comprises an I/O interface 66, a signal preprocessor 68, a first line memory circuit 70, an unsharpness processor 72, a second line memory circuit 74, a sharpness processor 76, and a halftone-dot image producer 78. These components are controlled by a CPU 80 which comprises a microprocessor or the like.

The I/O interface 66 is responsive to a control signal from the CPU 80 to apply a drive signal to the driver 38 for driving the galvanometer 36. The I/O interface 66 also supplies a grating signal from the amplifier 56 as a timing signal to the controller components 68, 70, 72, 74, 76, and 78. The signal preprocessor 68 processes an image signal from the amplifier 64 for gradation conversion, shading correction, etc. The first line memory circuit 70 comprises a plurality of line memories for unsharpness processing, and serves to store the image signal which has been processed by the signal preprocessor 68. The unsharpness processor 72 unsharpens, i.e., averages the image signal which is stored in the first line memory circuit 70. The second line memory circuit 74 also comprises a plurality of line memories for storing an image signal which has been processed by the unsharpness processor 72. The sharpness processor 76 sharpens, i.e., processes the image signal which is stored in the second line memory circuit 76, for edge sharpness. The halftone dot image producer 78 converts the image signal processed by the sharpness processor 76 into an on/off signal of a desired dot size based on a halftone dot signal, and supplies the on/off signal to the driver 28.

The image scanning reading and reproducing system which incorporates the image signal processing apparatus according to the present invention is basically constructed as described above. Operation and advantages of the image scanning reading and reproducing system will be described below.

An $Ar^+$ laser beam $B_1$ emitted from the laser beam source 18 is divided into an S-polarized component and a P-polarized component by the polarizing beam splitter 22, and only the S-polarized component is directed to the semireflecting mirror 26. The laser beam source 20 emits an HeNe laser beam $B_2$ which comprises only an S-polarized component. The laser beam $B_2$ is combined with the S-polarized component of the laser beam $B_1$ by the semireflecting mirror 26, and they are directed to the semireflecting mirror 32. The S-polarized components of the laser beams $B_1$, $B_2$ from the semireflecting mirror 26 are reflected by the semireflecting mirror 32 and converted by the halfwave plate 34 into P-polarized components, which are then applied to the galvanometer mirror 36. At this time, the galvanometer mirror 36 is being oscillated in the directions indicated by the arrow A by the driver 38 based on the drive signal which is supplied from the I/O interface 66 according to the control signal from the CPU 80. Therefore, the P-polarized components of the laser beams $B_1$, $B_2$ are deflected by the galvanometer mirror 36 and applied to the beam splitter assembly 46.

The P-polarized components of the laser beams $B_1$, $B_2$ are applied to the polarizing beam splitter 40 of the beam splitter assembly 46, and pass through the polarizing beam splitter 40 and the semireflecting mirror 42, after which they are reflected by the fully reflecting mirror 48 toward the reference grating 50. When the laser beams $B_1$, $B_2$ pass through the reference grating 50, they are converted into a pulsed light signal which is applied to the light guide bar 52. The pulsed light signal is then converted by the photomultiplier 54 into an electric grating signal which is supplied through the amplifier 56 to the I/O interface 66.

The P-polarized components of the laser beams $B_1$, $B_2$ which have been reflected by the semireflecting mirror 42 are caused by the oscillation of the galvanometer mirror 36 to scan the original S in a main scanning direction which is normal to the sheet of FIG. 1, and hence to the auxiliary scanning direction indicated by the arrow D. At this time, the original S is being fed in the auxiliary scanning direction indicated by the arrow D by the feed means 58. Consequently, the image information borne by the original S is two-dimensionally scanned by the laser beams $B_1$, $B_2$, and light reflected from the original S and carrying the image information thereof is transmitted through the light guide 60 to the photomultiplier 62. The photomultiplier 62 converts the light that carries the image information into an electric image signal, which is supplied through the amplifier 64 to the controller 16.

The electric image signal which has been supplied to the controller 16 is processed for gradation conversion, shading correction, etc. by the signal preprocessor 68 under the control of the CPU 80. The processed image signal is then transferred to the first line memory circuit 70, which stores one scanning line of the processed image signal at a time. The processed image signal stored in the first line memory circuit 70 is then processed by the unsharpness processor 72, stored in the second line memory circuit 74, and processed by the sharpness processor 76. Finally, the image signal is converted into a halftone dot image signal by the halftone dot image generator 78.

If the image signal borne by the original S that is read by the image reading apparatus 12 contains a regular or periodic pattern such as on a halftone-dot image, then when such image information is further processed for halftone dot formation, the image which will be reproduced on a photographic film F in the image recording apparatus 14 tends to have a moire pattern.

According to the illustrated embodiment, the image signal produced from the original S which contains a regular or periodic pattern is first processed for unsharpness and then processed for sharpness, so that the regular or periodic pattern will be less recognizable.

Figure 2:
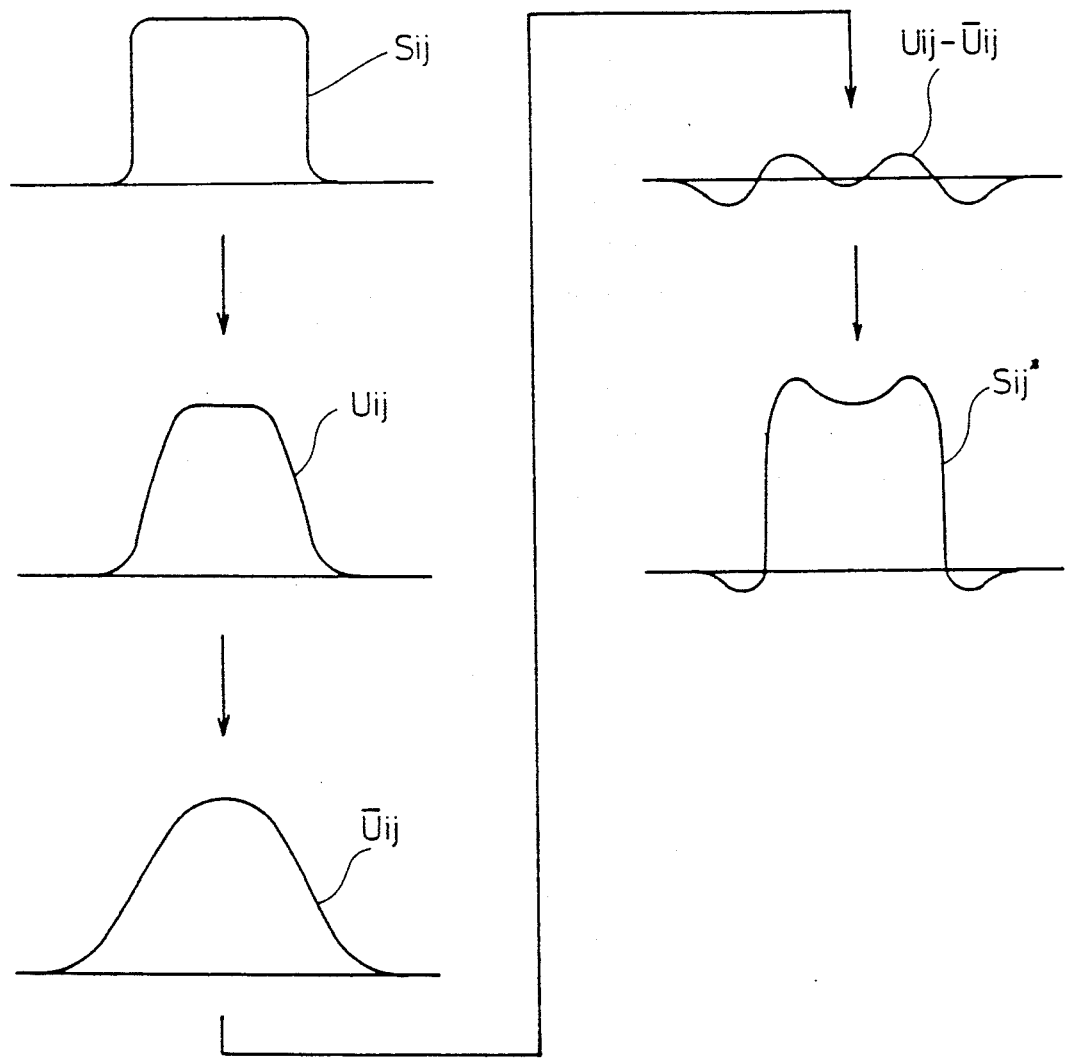
FIG. 2 is a diagram illustrative of an image signal processing method according to the present invention.

More specifically, if the image signal produced from the original S can be divided into $n \times n$ pixels, then the image signal Sij (i=1, ... n, j=1, ... n) stored in the first memory circuit 70 is converted into a first unsharpness signal Uij (see FIG. 2) which is an electrically blurred image signal by the unsharpness processor 72. The first unsharpness signal Uij is generated when image signals around the image signal Sij are averaged, and is given according to the following equation (1):

$$Uij = \sum_{k=i-L}^{i+L} \sum_{m=j-L}^{j+L} Skm/M^2 \quad (1)$$

where M is the number of pixels used when the first unsharpness signal Uij is generated, i.e., mask size data, and L is a parameter defined as $(M-1)/2$.

Then, the first unsharpness signal Uij is stored one line at a time in the second line memory circuit 74, and then processed for sharpness emphasis by the sharpness processor 76, thereby generating an image signal Sij*. More specifically, the sharpness processor 76 averages image signals around the first sharpness signal Uij to produce a second unsharpness signal $\overline{U}ij$ according to the following equation (2):

$$\overline{U}ij = \sum_{k=i-L}^{i+L} \sum_{m=j-L}^{j+L} Ukm/M^2 \quad (2)$$

The mask size data M used in the equation (2) may be different from the mask size data M used in the equation (1) Then, a signal representing the difference between the first unsharpness signal Uij and the second unsharpness signal $\overline{U}ij$. The difference signal is multiplied by a sharpness parameter K, and the product and the first unsharpness signal Uij are added, producing the image signal Sij* according to the following equation (3):

$$Sij^* = Uij + K \cdot (Uij - \overline{U}ij) \quad (3)$$

The frequency component of the regular or periodic pattern which is contained in the image signal Sij is averaged and removed when the first unsharpness signal Uij is generated by the unsharpness processor 72. Therefore, the sharpness processor 76 processes, for edge sharpness, the first unsharpness signal Uij which is free of the frequency component of the regular pattern, and the resultant image signal Sij* has no moire pattern.

If the image information borne by the original S represents an image, such as a photographic image, which does not contain any regular or periodic pattern, then the unsharpness processor 72 of the controller 16 is inactivated so that the image signal is subjected to only normal edge sharpness processing in the sharpness processor 76.

The image signal Sij* which has been processed for edge sharpness is thereafter converted by the halftone-dot image generator 78 into an on/off signal having a desired halftone-dot size based on a halftone-dot signal. The on/off signal is then supplied to the driver 28.

The driver 28 controls the light modulator 24 based on the supplied on/off signal. At this time, the P-polarized component of the laser beam $B_1$ that has passed through the polarizing beam splitter 22 is being applied to the light modulator 24. Therefore, the P-polarized component is modulated into a pulsed light signal depending on the image information by the light modulator 24 which is controlled by the driver 28. The pulsed light signal is reflected by the fully reflecting mirror 30 to the semireflecting mirror 32. The modulated P-polarized component of the laser beam $B_1$ passes through the semireflecting mirror 32 and is converted into an S-polarized component by the halfwave plate 34. The S-polarized component is then applied to the beam splitter assembly 46 through the galvanometer mirror 36. The polarizing beam splitter 40 of the beam splitter assembly 46 reflects only the S-polarized component of the laser beam $B_1$ to the fully reflecting mirror 44, which reflects the S-polarized component to the image recording apparatus 14. Therefore, the laser beam $B_1$ scans a photographic film F in the main scanning direction (normal to the sheet of FIG. 1) while the photographic film F is being fed in the auxiliary scanning direction indicated by the arrow C, thereby two-dimensionally recording the image on the photographic film F. Since the frequency component of any regular or periodic pattern contained in the image information read from the original S has been removed by the unsharpness process 72, the image recorded on the photographic film F is sharp and moire-free.

Figure 3:
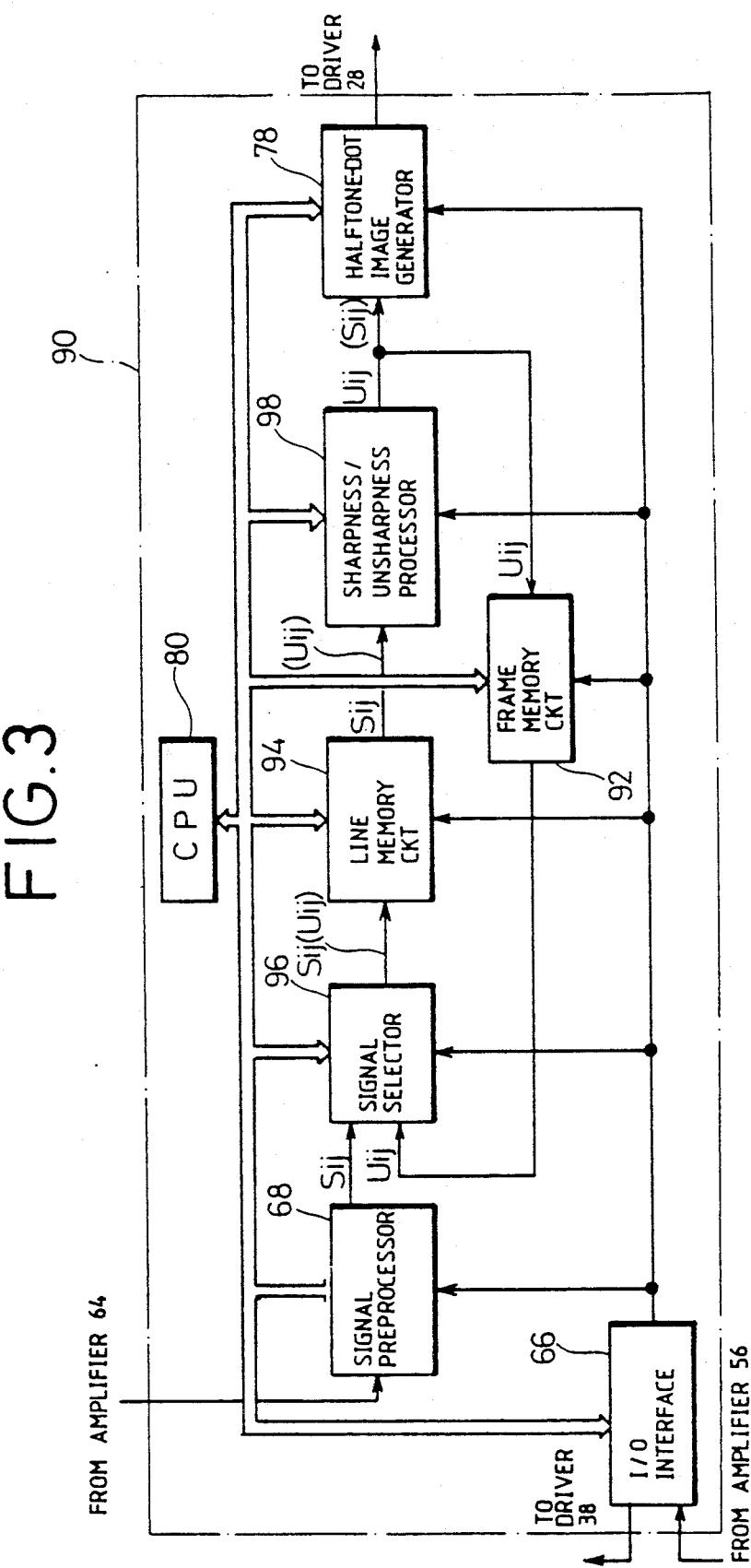
FIG. 3 is a block diagram of a controller according to another embodiment of the present invention, for use in the image signal processing apparatus.

FIG. 3 shows a controller 90 according to another embodiment of the present invention, for use in the image signal processing apparatus. Those parts of the controller 90 which are identical to those of the controller 16 shown in FIG. 1 are denoted by identical reference numerals, and will not be described in detail.

The controller 90 comprises an I/O interface 66, a signal preprocessor 68, a halftone-dot image generator 78, and a CPU 80, which are identical to those shown in FIG. 1, and also has a frame memory circuit 92, a line memory circuit 94, a signal selector 96, and a sharpness/unsharpness processor 98. The signal selector 96 selects an image signal Sij from the signal preprocessor 68 or a first unsharpness signal Uij from the frame memory 92, and sends the selected image to the line memory 94. The sharpness/unsharpness processor 98 generates the first unsharpness signal Uij from the image signal Sij or an image signal Sij* from the first unsharpness signal Uij through edge sharpness processing.

The sharpness/unsharpness processor 98 is programmed or has a circuit to execute the sequence for carrying out the arithmetic operations indicated by the equation (1) and also is programmed or has a circuit to execute the sequence for carrying out the arithmetic operations indicated by the equation (2). One of the programmed sequences or circuits is selected according to a command signal from the CPU 80 for a desired signal processing procedure. The sharpness/unsharpness processor 98 is also programmed or has a circuit to execute the sequence for carrying out the arithmetic operations indicated by the equation (3). More specifically, in response to a command signal from the CPU 80, the sharpness/unsharpness processor 98 generates a first unsharpness signal Uij with the sharpness parameter K being set to "−1", and also generates an image signal Sij* with the sharpness parameter K being set to "0" or positive data.

In operation, when image information is to be read from an original S, the signal selector 96 connects the signal preprocessor 68 and the line memory circuit 94 to each other in response to a command signal form the CPU 80. An image signal Sij, which has been processed for gradation conversion, shading correction, etc. by the signal preprocessor 68, is transmitted through the signal selector 96 to and stored, one line at a time, in the line memory circuit 94. Thereafter, the stored image signal Sij is transferred to the sharpness/unsharpness processor 98.

In response to a command signal from the CPU 80, the sharpness/unsharpness processor 98 unsharpens the image signal Sij to generate a first unsharpness signal Uij represented by the equation (1). The first unsharpness signal Uij is stored, as one image of the original S, in the frame memory 92. At this time, the halftone-dot image generator 78 is held inactive by the CPU 80.

Then, the signal selector 96 connects the frame memory circuit 92 and the line memory circuit 94 in response to a command signal from the CPU 80. The first unsharpness signal Uij stored in the frame memory circuit 92 is then read out, one line at a time, from the frame memory circuit 92 and transmitted through the signal selector 96 to the line memory circuit 94 in response to a signal which is supplied from the I/O interface 66 in synchronism with the scanning operation of the image reading apparatus 12. The line memory circuit 94 transfers the first unsharpness signal Uij to the sharpness/unsharpness processor 98. Based on a command signal from the CPU 80, the sharpness/unsharpness processor 98 processes the first unsharpness signal Uij for edge sharpness, thereby generating an image signal Sij* represented by the equation (3). The image signal Sij* is thereafter converted by the halftone-dot image generator 78 into an on/off signal based on a halftone-dot signal in response to a command signal from the CPU 80. The on/off signal is then supplied to the driver 28, which records the image information on a photographic film F (FIG. 1).

If the image information borne by the object S does not contain any regular or periodic pattern, then the signal preprocessor 68 and the line memory circuit 94 remain connected to each other by the signal selector 96, and the sharpness parameter K is set to "0" or positive data in the sharpness/unsharpness processor 98. As a consequence, the image signal is subjected to only normal edge sharpness processing in the sharpness/unsharpness processor 98.

With the present invention, as described above, image information containing a regular pattern is first processed for unsharpness and then processed for edge sharpness, after which the processed image signal is converted into a halftone-dot image signal. Since the frequency component of the regular pattern contained in the image information is removed by the unsharpness processing, the resultant halftone-dot image is sharp and free of any undesired moire pattern. Consequently, it is possible to prepare a high-quality film plate for platemaking from image information which contains a regular or periodic pattern.

Although certain preferred embodiments have been shown and described, it should be understood that many changes and modifications may be made therein without departing from the scope of the appended claims.

What is claimed is:

1. A method for processing an image signal representing image information containing a periodic pattern comprising the steps of:
    averaging the image information for removing periodic pattern components from said image signal to generate an unsharpness signal;
    processing said unsharpness signal for edge sharpness to generate a sharpness signal; and
    generating a halftone-dot image from said sharpness signal.

2. A method according to claim 1, further including the step of generating the sharpness signal Sij* from a first unsharpness signal Uij which is produced by averaging the image information and a second unsharpness signal $\bar{U}ij$ which is produced by averaging said first unsharpness signal Uij, according to the equation:

$$Sij^* = Uij + K \cdot (Uij - \bar{U}ij)$$

where
    j = 1, 2, . . . n,
    j = 1, 2, . . . n, and
    K: sharpness parameter.

3. An apparatus for processing an image signal representing image information containing a periodic pattern, comprising:

unsharpness processor means for averaging the image information for removing periodic pattern components from said image signal to generate an unsharpness signal;

sharpness processor means for processing said unsharpness signal for edge sharpness to generate a sharpness signal; and halftone-dot image generator means for generating a halftone-dot image from said sharpness signal.

4. An apparatus for processing an image signal representing image information containing a periodic pattern, comprising:

unsharpness processor means for averaging the image information to generate an unsharpness signal;

sharpness processor means for processing said unsharpness signal for edge sharpness to generate a sharpness signal;

memory means for storing said unsharpness signal;

signal selector means for selectively transmitting the image signal representing the image information to said unsharpness processor and said unsharpness signal from said memory means to said sharpness processor; and halftone-dot image generator means for generating a halftone-dot image from said sharpness signal.

* * * * *